United States Patent [19]
Frisch et al.

[11] Patent Number: 5,728,332
[45] Date of Patent: Mar. 17, 1998

[54] METHOD OF MAKING A MULTI-LEVEL, EXPANDED RESINOUS PRODUCT

[75] Inventors: Rudolf Frisch; Marina Gillis, both of Yardley, Pa.

[73] Assignee: Congoleum Corporation, Mercerville, N.J.

[21] Appl. No.: 560,597

[22] Filed: Nov. 20, 1995

Related U.S. Application Data

[63] Continuation of Ser. No. 175,937, Dec. 20, 1993, abandoned.

[51] Int. Cl.$^6$ .................................................. B29C 44/06
[52] U.S. Cl. .......................... 264/46.4; 156/79; 264/45.1; 264/52; 264/54; 264/DIG. 82
[58] Field of Search ........................ 264/46.4, 52, 54, 264/45.1, DIG. 82; 156/79

[56] References Cited

U.S. PATENT DOCUMENTS

| | | | |
|---|---|---|---|
| 3,293,094 | 12/1966 | Nairn et al. | 156/79 |
| 3,464,934 | 9/1969 | Birkett et al. | 260/2.5 |
| 3,660,187 | 5/1972 | Shortway et al. | 156/79 |
| 3,671,283 | 6/1972 | Crowley | 264/45.1 |
| 3,819,783 | 6/1974 | Jones | 264/52 |
| 4,012,248 | 3/1977 | Rump et al. | 156/79 |
| 4,029,612 | 6/1977 | Collington | 260/2.5 E |
| 4,068,030 | 1/1978 | Witman | 261/54 |
| 4,083,907 | 4/1978 | Hamilton | 264/52 |
| 4,085,239 | 4/1978 | Briston et al. | 427/208 |
| 4,093,686 | 6/1978 | Briston et al. | 264/45.5 |
| 4,113,487 | 9/1978 | Matsunaga et al. | 96/33.1 |
| 4,187,338 | 2/1980 | Muira | 428/159 |
| 4,196,244 | 4/1980 | Roman | 428/159 |
| 4,198,456 | 4/1980 | Adams et al. | 428/159 |
| 4,212,691 | 7/1980 | Potosky et al. | 156/79 |
| 4,230,759 | 10/1980 | Kauffman et al. | 264/45.1 |
| 4,273,819 | 6/1981 | Schmidle et al. | 264/DIG. 82 |
| 4,277,427 | 7/1981 | Kaminski et al. | 264/54 |
| 4,302,489 | 11/1981 | Hattori et al. | 264/DIG. 82 |
| 4,320,163 | 3/1982 | Schwartz | 428/158 |
| 4,369,065 | 1/1983 | Brixius | 106/27 |
| 4,407,882 | 10/1983 | Hauser et al. | 428/159 |
| 4,482,598 | 11/1984 | Ishii et al. | 428/195 |
| 4,844,849 | 7/1989 | Miller et al. | 264/DIG. 82 |
| 5,256,465 | 10/1993 | Martin et al. | 264/45.1 |
| 5,336,693 | 8/1994 | Frisch | 521/72 |

*Primary Examiner*—Allan R. Kuhns
*Attorney, Agent, or Firm*—Synnestvedt & Lechner

[57] ABSTRACT

A process for preparing multi-level, selectively expanded, resinous sheeting comprising:

(A) providing a composite comprising a backing material and adhered thereto a layer of a foamable resin which contains a blowing agent;

(B) forming a partially printed composite by applying to a portion of the surface of the layer a composition containing an accelerator which functions to lower the temperature at which the blowing agent decomposes and by applying to some, but not all, of the other portions of the surface of the layer a composition containing an inhibitor which functions to decrease the activity of the blowing agent; and (C) forming the multi-level, selectively expanded, resinous sheeting by raising the temperature of the printed composite to a level such that the blowing agent decomposes and the resin fuses, the decomposition of the blowing agent evolving gas which causes expansion of the foamable resin in the portion where the surface is not printed and expansion of the foamable resin in the portion where the surface is printed with said accelerator-containing composition, the latter portion being expanded to a greater extent than the former, and wherein the portion of the surface printed with said inhibitor-containing composition is unexpanded or expanded to a limited degree; and a resinous product having a printed base portion, an unprinted expanded portion elevated above the base portion and a printed expanded portion elevated above the unprinted expanded portion, the resin portion of the product being substantially uniform throughout the product.

20 Claims, 2 Drawing Sheets

RESIDENCE TIME IN A SINGLE-ZONE FUSION OVEN,
375°F AIR TEMPERATURE

A-14% - PRINTED WITH A WATER-BASED ACCELERATOR-CONTAINING COMPOSITION CONTAINING 14 WT.% UREA

A-7% - PRINTED WITH A WATER-BASED ACCELERATOR-CONTAINING COMPOSITION CONTAINING 7 WT.% UREA

NP - NOT PRINTED

I-12% - PRINTED WITH A WATER-BASED INHIBITOR-CONTAINING COMPOSITION CONTAINING 12 WT.% TOLYLTRIAZOLE

I-17% - PRINTED WITH A WATER-BASED INHIBITOR-CONTAINING COMPOSITION CONTAINING 17 WT.% TOLYLTRIAZOLE

I-21% - PRINTED WITH A WATER-BASED INHIBITOR-CONTAINING COMPOSITION CONTAINING 21 WT.% TOLYLTRIAZOLE

METHOD OF MAKING A MULTI-LEVEL, EXPANDED RESINOUS PRODUCT

This is a continuation of application Ser. No. 08/175,937 filed on Dec. 30, 1993, now abandoned.

FIELD OF THE INVENTION

The present invention relates to the production of a resinous product, some portions of which are expanded to varying degrees or heights, that is, a multi-level, selectively-expanded, resinous product. More particularly, the present invention relates to the production of a multi-level, selectively-expanded, resinous product by use of a blowing agent and of compositions which modify the activity of the blowing agent in various ways.

The present invention is exemplified herein in connection with the production of foamed, textured floor coverings, especially vinyl sheet goods or sheeting. Products prepared in accordance with the present invention are also broadly useful in a variety of other applications, as described hereinbelow.

Techniques for forming chemically textured foamable resinous products are well-known in the art. Such techniques were developed primarily for use in the production of textured floor coverings and similar sheet materials, as described, for example, in U.S. Pat. No. 3,293,094, issued to Nairn et al. on Dec. 20, 1966, and incorporated herein by reference. As disclosed in this patent, a foamed, textured polymeric material is produced from a foamable resinous composition having a blowing agent incorporated therein by selective application to the surface of the composition of a modifier which affects the activity of the blowing agent in either a direct or an indirect fashion. For example, in a typical industrial process for producing textured floor covering, a plastisol which contains a blowing agent is applied to a backing material and heat-treated to convert the plastisol to a foamable composition, usually referred to as a "gel", under conditions which do not activate the blowing agent. An embossing composition containing a modifier for the blowing agent is applied to the gel, usually to selected portions thereof in a predetermined pattern. This is accomplished typically by applying the embossing composition to the gel by use of a rotogravure printing cylinder. A liquid resin-based composition is typically applied to the printed gel and heated to form a coating which is eventually fused to form a wearlayer.

Thereafter, the printed coated gel is heated to activate the blowing agent which expands to effect differential foaming or expansion of the gel due to the presence of the modifier on selected portions of the gel and to fuse the gel and the resin coating of the wearlayer composition. This results in the production of an embossed or textured composite, the surface of which is covered with a wearlayer. Modifiers having various functions are known, including modifiers which inhibit activity of the blowing agent per se or which inhibit activity of a catalyst or activator which is admixed with the blowing agent in the gel. Typically, the inhibitor-containing composition is patterned on the gel in the form of a liquid formulation having the rheological characteristics required for the particular application. The essential ingredients of such liquid formulations are the inhibitor and a material, for example, a film-forming resin which is dissolved or dispersed in the liquid phase of the formulation and which functions as a binder as the formulation dries. In addition, the formulation usually contains a colorant, for example, a pigment or dye, which imparts color to the design of the textured pattern. Such a liquid formulation which comprises an inhibitor and a binder and optionally a colorant is referred to herein as "inhibitor-containing composition".

The aforementioned Nairn et al. patent discloses an embodiment which is prepared by utilizing various concentrations of the inhibitor-containing composition. This results in the formation of product in which the portions of the foamable composition that are not printed with the inhibitor-containing composition are expanded or foamed to the highest degree, and portions printed with the inhibitor-containing composition are either not expanded or are expanded to lesser and varying degrees, depending on the concentrations of the inhibitor-containing composition. Thus, the aforementioned Nairn et al. patent discloses a selectively expanded, resin-based product which is multi-level in that the expanded portions are expanded to varying degrees or heights which rise above the base portions (unexpanded or expanded to an imperceptible degree) of the product.

The present invention relates to improved means for forming an improved multi-level, selectively expanded, resin based product.

Reported Developments

In addition to the aforementioned Nairn et al. patent, there are other patents which disclose sheeting which consists of a multi-ply composite and which includes a multi-level, selectively-expanded, resinous-based ply.

U.S. Pat. No. 4,068,030 discloses the printing of portions of the surface of a resin-based composition with different types of foamable compositions, at least one of which contains a blowing agent and at least one other of which contains a blowing agent having an accelerator therefore. (The accelerator lowers the temperature at which the blowing agent decomposes.) The resin-based composition includes a polymerizable monomer, and it may also include a blowing agent. The surface of the resin-based composition is also printed with a composition which contains the same type of polymerizable monomer that is present in the resin-based composition, together with a catalyst which effects polymerization of the monomers. In an embodiment in which a nonfoamable, resin-based composition is used, those portions printed with a monomer and/or catalyst-containing composition stand substantially higher than the portions where such composition has not been applied. Those portions printed with the non-monomer, blowing agent-containing foamable compositions are highest in elevation, while those printed with conventional nonfoamable compositions are intermediate in height between the height of the unprinted portions and the portions printed with the catalyst-containing composition.

U.S. Pat. Nos. 4,085,239 and 4,093,686 disclose the application of a printing composition which includes a kicker to the surface of a resin-based composition that includes a blowing agent. (The terms "kicker" and "accelerator" are often used interchangeably in the field which relates to foam production.) The printed resin-based composition is heated to a temperature at which the blowing agent in contact with the kicker decomposes, such temperature being below that at which the blowing agent normally decomposes. The portions of the sheet in contact with the kicker-containing composition are expanded to a greater extent than the portions not in contact with a kicker-containing composition. By utilizing kicker-containing compositions which have different concentrations of kicker, a product with varying degrees of expansion can be produced.

U.S. Pat. No. 4,113,487 discloses the expansion of a foamable resin-based composition which includes a blowing agent, a polymerizable monomer, and a polymerization initiator, the initiator being capable of being activated by a light source. Portions of the surface of the foamable resinous composition are printed with a UV screening composition. When the printed surface is exposed to light, the screening composition prevents the activation of the polymerization initiator so that the resin which underlies the printing composition is not capable of being cured and is thus in expandable form, unlike the unprinted portions which are capable of being cured, and, therefore, not in expandable form. By using UV screening compositions that have different degrees of screening effects, it is possible to produce an article in which the expanded portions differ in height, and are, therefore, multi-level.

U.S. Pat. No. 4,198,456 discloses the printing of portions of the surface of a foamable resin-based composition that includes a blowing agent with a plurality of compositions that include vinyl resins of molecular weights that vary to the extent that the printing compositions have melt viscosities which are distinguishably different. As the foamable composition is heated and the blowing agent decomposes, the printing compositions, with their different melt viscosities, exhibit different physical restriction toward expansion, with the result that the expanded portions are of varying heights.

U.S. Pat. No. 4,277,427 discloses the application to portions of an expandable resinous composition which contains a blowing agent of flakes of a resinous composition which contains an inhibitor for the blowing agent. By varying the size and the amount of flakes that are applied to portions of the surface of the expandable composition, the degree of expansion can be varied, thereby producing a multi-level, selectively-expanded, resinous composition. Varied effects can be produced also by printing other portions of the surface of the expandable composition with conventional inhibitor-containing compositions.

U.S. Pat. No. 4,320,163 discloses the application to portions of a substrate of an expandable composition, for example, a foamable plastisol which contains a blowing agent. The expandable compositions can be applied to the substrate by a printing roll having different engraving depths. The use of such a printing roll deposits printing compositions of varying thicknesses. This technique can be used to produce expanded compositions whose levels of expansion or heights are varied.

U.S. Pat. No. 4,844,849 discloses a multi-level, selectively-expanded sheeting which comprises multi-layered plies which are treated with different printing compositions in order to achieve the multi-level effect. For example, in one embodiment, the surface of a resinous composition is printed with a resin-based composition which contains a blowing agent. The printed resin-based composition is then covered with a layer of thermoplastic resin having a viscosity such that portions in contact with the blowing agent-containing composition are expanded as the blowing agent decomposes with the evolution of gas. This technique can be used in combination with initially forming a foamable thermoplastic resin layer printed with an inhibitor-containing composition or an activator-containing composition. The result is a multi-layered decorative sheet which includes multi-level expanded portions.

There are various disadvantages associated with the use of processes of the type described in the aforementioned patents and unattractive aspects of products produced by such processes. In various of the processes, the expanded portions having the highest elevation are limited to those portions which have not been printed with a composition that is capable of modifying the activity of the blowing agent (for example, see U.S. Pat. No. 4,277,427). This limits the decorative effects that can be obtained. In other of the processes, the nature of the compositions and the processing techniques makes for a complicated and relatively expensive product (for example, see U.S. Pat. Nos. 4,068,030; 4,113, 487; 4,320,163 and 4,844,849). Various of the processes are such that the process parameters are difficult, if not impossible, to control in a manner such that the desired functional, aesthetic or decorative effects are capable of being achieved or a consistent basis in industrial production. Problems likely to be encountered include the production of foamed products which have unsatisfactory load-bearing properties, products in which the textured appearance is irreversibly lost upon its being wound into a roll for the purposes of shipment or storage, products which include constituents which are not stable, and/or products which require for their production the use of specialized equipment and which are thus relatively expensive to produce. (for example, see U.S. Pat. Nos. 4,085,239 and 4,093,686).

In view of the shortcomings of prior art techniques for forming a multi-level, selectively-expanded, resinous product, the present invention is directed to an improved product of this type that is capable of being produced by an improved and efficient manufacturing process, including, for example, a process which is capable of being carried out by the use of equipment and materials which are currently in common use in the industry.

SUMMARY OF THE INVENTION

In accordance with the present invention, there is provided a process for preparing multi-level, selectively expanded, resinous sheeting comprising:

(A) providing a composite comprising a backing material and adhered thereto a layer of a foamable resin which contains a blowing agent;

(B) forming a partially printed composite by applying to a portion of the surface of the layer a composition containing an accelerator which functions to lower the temperature at which the blowing agent decomposes and by applying to some, but not all, of the other portions of the surface of the layer a composition containing an inhibitor which functions to decrease the activity of the blowing agent; and (C) forming the multi-level, selectively expanded resinous sheeting by raising the temperature of the printed composite to a level such that the blowing agent decomposes and the resin fuses, the decomposition of the blowing agent evolving gas which causes expansion of the foamable resin in the portion where the surface is not printed and expansion of the foamable resin in the portion where the surface is printed with said accelerator-containing composition, the latter portion being expanded to a greater extent than the former, and wherein the portion of the surface printed with said inhibitor-containing composition is unexpanded or expanded to a limited degree.

In preferred form, the foamable resin is a gelled plastisol which includes also an activator for the blowing agent and the inhibitor of the inhibitor-containing composition deactivates said activator. The inhibitor-containing composition is preferably water-based.

Another aspect of the present invention encompasses a multi-level, selectively expanded, resin-based product having therein the residue of a decomposed blowing agent, the resin portion of the product being substantially uniform throughout the product, and comprising:

(a) a printed base portion;
(b) an unprinted expanded portion elevated above the base portion; and
(c) a printed expanded portion elevated above said unprinted portion;

wherein the expanded unprinted portion and the expanded printed portion of the composition includes said residue of the decomposed blowing agent.

In preferred form, the aforementioned product comprises a ply in sheeting which is suitable for use as a floor covering, the resin-based composition consists essentially of a fused poly(vinyl chloride) plastisol, and the sheeting includes:

(A) a backing material which underlies and is adhered to the resin-based composition; and
(B) a wear layer which overlies and is adhered to the resin-based composition.

There are a number of advantages which are associated with the present invention.

Principal advantages of the present invention are that a variety of attractive decorative effects can be obtained in products which are capable of being manufactured by a combination of processing techniques which have a long history of successful industrial use. This enables the manufacturer to produce a high-quality product without having to make a significant capital investment inasmuch as machinery, equipment, printing rolls, etc. are readily available for the manufacturing process.

The present invention can be used effectively to manufacture foamed products that have a variety of different appearances. The ability to expand the surfaces selectively greatly increases design possibilities. Products with relief effects which resemble the appearance of ceramic tile and of stone and slate and other naturally occurring materials can be produced. In addition, products with a surface that has a sculptured appearance can be formed. Products with an attractive surface texture that can imitate recessed marble veins or grouting can also be made.

DETAILED DESCRIPTION OF THE INVENTION

The process aspects of the present invention involve performance of the following steps. A backing material is coated with a resin-based composition having incorporated therein a blowing agent. The blowing agent is typically a compound which decomposes at elevated temperature to yield an inert gas. If necessary, the composition is heated to gel the resin, but at a temperature below that at which the blowing agent decomposes. Thereafter, one or more, but less than all, portions of the surface of the resin-based composition have applied thereto either an inhibitor-containing composition or an accelerator-containing composition. One or more other portions of the surface are then printed with the other of the compositions. Two or more different kinds of inhibitor-containing compositions or of accelerator-containing compositions can be used to give a variety of effects as may be desired. Such compositions can differ in that they can include different concentrations of the accelerator and/or inhibitor and/or they can include different kinds of accelerators and/or inhibitors.

The inhibitor is a material which decreases the activity of the blowing agent either directly or indirectly as described hereinbelow. The accelerator (also referred to in the art as a "kicker") is a material which lowers the decomposition temperature of the blowing agent. Upon heating, those surface portions of the resin-based composition that are printed with the accelerator-containing composition expand before expansion, if any, of the portions not so printed. The "accelerator" expanded portions remain elevated above the expanded unprinted portions when they expand as the temperature is elevated to decompose the blowing agent which has not been contacted with the inhibitor. Heating of the composite is controlled so that its temperature is not permitted to rise to a level at which the blowing agent underlying the "inhibitor" printed surface of the composition decomposes, or decomposes to a limited extent, that is, to an extent such that the resin-based composition expands to a height that is noticeably less than the height of the expanded unprinted portions of the composition. The composite is heated until the resin portion thereof fuses.

Figure 1:
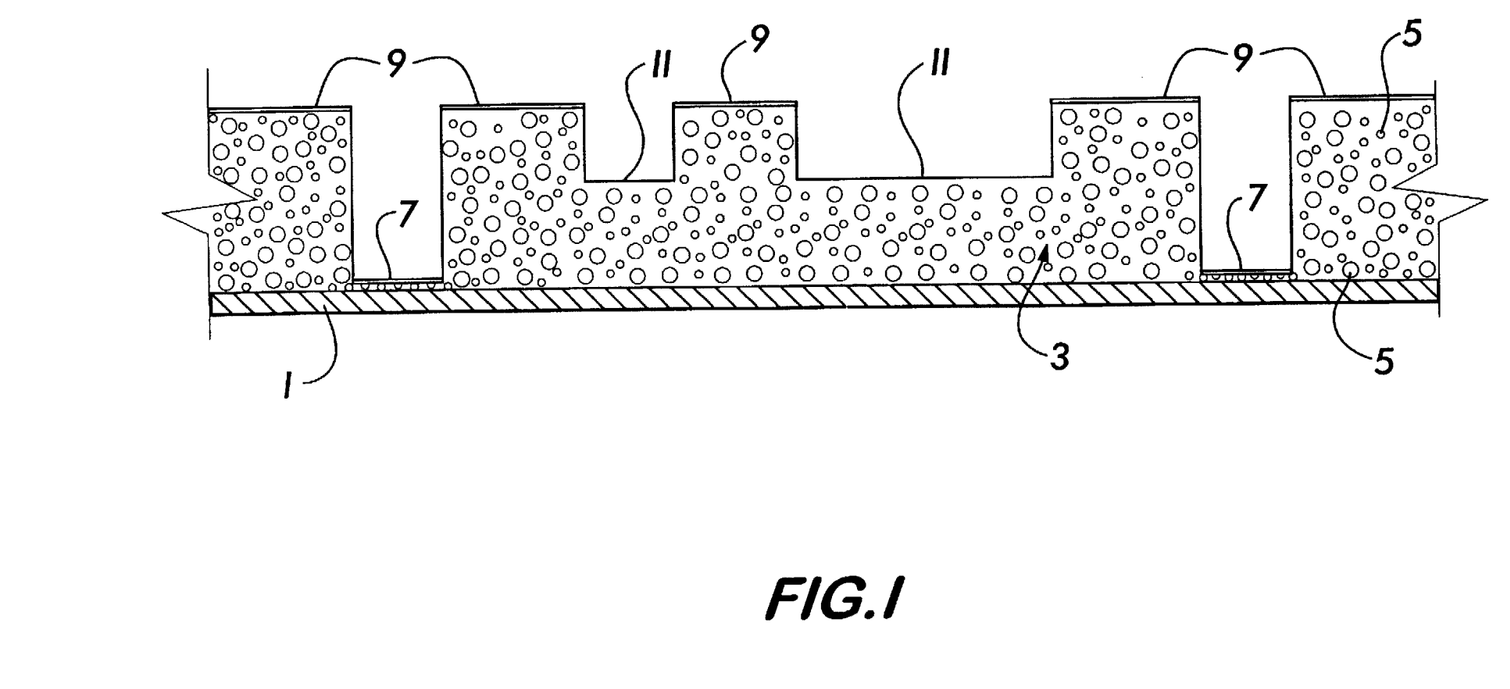
FIG. 1 is an enlarged cross-sectional view of a product produced in accordance with the present invention.

As shown in FIG. 1, the resulting product is a multi-level, selectively expanded product, that is, the product has at least two elevated portions which rise above the printed base portion of the product, with one of the elevated portions rising above the other elevated portion. The former is a printed expanded portion of the product, whereas the latter is an unprinted expanded portion of the product.

More specifically, FIG. 1, which is not drawn to scale, illustrates sheeting that includes a backing material 1 and a multi-level, selectively-expanded, resin-based composition generally indicated as 3. The foamed nature of the expanded composition is generally indicated by the circles 5. The expanded portions of the resin-based composition 3 include the residue (not shown) of decomposed blowing agent. The nature of the embodiment shown in FIG. 1 is such that the resin portion of the expanded composition is substantially uniform throughout the composition, as distinguished, for example, from the multi-level, selectively-expanded, resin-based composition shown in U.S. Pat. No. 4,198,456 which discloses the use of resins which are dissimilar in that they have different molecular weights and melt viscosities. It should be understood that the resins-based composition can comprise a mixture of two or more resins and other constituents also. The make-up of the composition is, nevertheless, substantially uniform throughout the composition save for differences due to the decomposition or lack of decomposition of the blowing agent.

As shown in FIG. 1, printed base portions 7 are expanded to a limited degree in that these portions are printed with an inhibitor-containing composition which inhibits directly or indirectly the activity of the blowing agent which is present in that portion of the resin-based composition which underlies the "inhibitor" printed portion. The expanded portions 9 of highest elevation of the sheeting shown in FIG. 1 are those portions printed with the accelerator-containing composition. The expanded portions 11, which are intermediate in height between the base portions 7 and the printed expanded portions 9, are those portions of the resin-based composition which were not contacted with a material that influences the activity of the blowing agent.

There follows a description of the various types of materials that can be used to make sheeting of the type illustrated in FIG. 1 and process steps that can be used to make the sheeting.

Backing Material/Foamable Composition

The expandable resin-based composition which is used in the fabrication of product of the present invention is applied to a backing material, that is, a material which functions as a support or carrier for the composition. Such backing material can comprise, for example, a felt material, a polymeric material, or a fiber-reinforced material, including, for example, fibers of glass and natural and synthetic fibers. The backing material can be a permanent ply of the final product or it can be separated from the expanded composition. If separated, release paper can be used as the backing material. Release paper conventionally has a coating on its surface to allow it to be stripped readily from the resin-based composition. Exemplary coatings comprise clays, silicone compositions and poly(vinyl alcohol).

The expandable (or foamable) resin-based composition that is applied to the backing material comprises a resin and a blowing agent, and optional constituents, as may be desired. The aforementioned Nairn et al. patent contains an extensive discussion of the preparation of such foamable compositions and cites numerous examples of resins, plasticizers, and blowing agents, as well as materials which have an effect on increasing the activity of the blowing agent, and various types of additives. Poly(vinyl chloride) is the most popularly used resin in the industry, although there can be used other resins such as, for example, other vinyl chloride polymers, including copolymers thereof, and resins such as polyurethanes, polystyrenes and polyamides. A mixture of two or more resins can be used, the mixture being substantially uniform in composition throughout its make-up.

The foamable polymeric material is made preferably from a plastisol which comprises resin solids dispersed in a liquid medium, most preferably a plasticizer or a plasticizer blend. Examples of plasticizers include dioctyl phthalate, butyl benzyl phthalate, di-(2-ethyl hexyl) phthalate and tricresyl phosphate.

The blowing agent, which is a compound that liberates an inert gas upon being decomposed (for example, by heating), is typically azodicarbonamide, this being the most widely used blowing agent in industry. However, in accordance with knowledge in the art, there can be used other blowing agents, for example, bis-(p-hydroxybenzenesulfonyl) hydrazide, azobisisobutyral-nitrile and diazoaminobenzene. In unmodified form, azodicarbonamide typically decomposes at a temperature of about 390° F. to about 450° F.

In preferred form, the expandable, resin-based composition includes also an activator which increases the rate of the decomposition of the blowing agent, reduces the decomposition temperature of the blowing agent and/or causes the blowing agent to decompose within a narrower temperature range. The relative amounts of the activator and blowing agent should be such as to insure that the decomposition temperature of the blowing agent is lower than the fusion temperature of the resin so that the foam structure is uniform and has the desired physical properties. Common activators are various metal salts, for example, dibasic lead stearate, zinc laurate, zinc oxide, zinc stearate, zinc carbonate, zinc 2-ethyl hexoate, calcium octoate, barium stearate, calcium stearate, nickel stearate, aluminum stearate, magnesium stearate, tin stearate, dibutyl tin maleate, and dibutyl tin oxide. Metal salts which are capable of functioning as activators are believed to be capable of forming complexes or ligands with nitrogen, oxygen and/or sulfur atoms that are typically present in compounds which function as blowing agents, inhibitors, and accelerators.

The preferred activator is zinc oxide. This material is the activator that is used most widely throughout the vinyl floor covering industry.

As is well known, the expandable resin-based composition can include other constituents which impart desired properties to the composition and the product formed therefrom. Examples of such constituents include stabilizers to minimize the degrading effects of light and heat, for example, ultra-violet light absorbers, anti-oxidants, and other thermal stabilizers and radical scavengers, and optical brighteners, and colorants, including pigments and dyes, and fillers.

After the expandable composition of the aforementioned type is applied to the backing material, the resulting composite is heated, if necessary, to a temperature sufficiently high to gel the resin-based composition, but to a temperature below that at which the blowing agent decomposes. The temperature used will be determined by the nature of the expandable composition, as is known in the art. It is believed that temperatures used most widely to gel a plastisol composition will generally fall within the range of about 275° F. to about 325° F.

Printing Compositions

Some, but less than all, portions of the surface of the expandable, resin-based composition are thereafter printed with an inhibitor-containing composition and with an accelerator-containing composition. The sequence of the application of these compositions is a matter of choice.

The term "printed" is used herein to refer to the application, by any suitable means, to a portion(s) of the surface of the expandable composition of a material which in some desired way modifies, either directly or indirectly, the activity of the blowing agent which is included in the expandable composition. (Such material is also referred to herein as a "modifying material".) The activity of the blowing agent is modified to the extent that there is an observable difference (observable to the naked eye) in the appearance of the expanded product due to the manner in which the expansion of the composition has been influenced by the effects of the modifying material on the blowing agent.

The term "unprinted" is used herein to refer to the portion or portions of the surface of the expandable composition to which a modifying material has not been applied. It should be understood that such portion(s), can have applied thereto a material which is not a modifying material. Examples of such materials are colorants and decorative particles.

Inhibitor-Containing Composition

The inhibitor is a material which significantly alters the decomposition temperature of the blowing agent in the area of the foamable composition below where it is deposited. At the temperatures of operation, the inhibitor prevents the blowing agent from causing the composition to expand or permits expansion of the composition to a limited degree. The inhibitor can function by directly deactivating the blowing agent or by deactivating an activator which is mixed with the blowing agent.

As is known, the chemical compositions of the blowing agents and activators vary widely and, therefore, the type of compound utilized as an inhibitor will vary. Examples of classes of compounds reported to be effective as inhibitors to alter the decomposition temperatures for blowing agents which contain the —N=N— or N—N linkages and which are most commonly used with a metal salt activator are the following: organic acids, particularly those having at least two carboxyl groups and one hydroxy group and which contain from 2 to 12 carbon atoms; organic acid halides, preferably those which contain from 2 to 20 carbon atoms, and 1-intro-2-anthraquinonecarboxyl chloride; organic acid anhydrides, preferably those containing from 2 to 20 carbon atoms, polyhydroxy alcohols, including particularly aliphatic alcohols which can contain at least two hydroxy groups; nitrogen-containing compounds such as amines, amides, oximes, and the like; sulphur-containing compounds such as thiols or mercaptans, sulfides, sulfones, sulfoxides, sulfonic acids, sulfonyl chloride, sulfonamides, sulfimides and the like; ketones and aldehydes, and phosphate and phosphite compounds. Various inhibitors are characterized by an unsaturated ring structure which appears to be associated with promoting a high degree of resonance and formulation of stable compounds when associated with metal salts such as, for example, zinc oxide.

Some examples of inhibitors are thiourea; triethanolamine; hydroquinone; resorcinol; tetra sodium salt of ethylenediamine tetraacetic acid; trisodium salt of ethylenediamine triacetic acid, hydroxy; benzotriazole; trimellitic anhydride; tolyltriazole; substituted imidazolidone (Aerotex 900 of American Cyanamid); hexamethoxymethylmelamine; substituted benzotriazole (Reomet 39 of Ciba Geigy); and substituted tolytriazole (Reomet 42 of Ciba Geigy). The inhibitory activity of the aforementioned materials was confirmed in tests involving their use in modifying the activity of azodicarbonamide blowing agent in a foamable composition that comprised a gelled vinyl plastisol and zinc oxide. Trimellitic anhydride is an interesting material in that it functions as an inhibitor in the aforementioned type composition, but it functions as an accelerator when the composition does not contain zinc oxide.

The preferred inhibitors for use in the practice of the present invention are tolyltriazole, benzotriazole, imidazolidone, hexamethoxymethylmelamine and trimellitic anhydride.

The inhibitor is applied typically in the form of a liquid composition that includes a liquid carrier and a binder, for example, a film-forming resin that is dissolved or dispersed in the liquid composition. Such inhibitor-containing liquid compositions are well known. They can be organic-based compositions or they can be water-based compositions by virtue of the liquid carrier being substantially water. Alternatively, the inhibitor can be dissolved in an organic solvent which is miscible with water; this is particularly useful when using a relatively low concentration of inhibitor, for example, about 1 to about 7 wt.% (based on total weight of the inhibitor-containing composition). Organic-based compositions are disclosed, for example, in aforementioned U.S. Pat. No. 3,293,094 to Nairn et al. and in No. 3,660,187 to Shortway et al. Aqueous-based compositions are disclosed, for example, in U.S. Pat. Nos. 4,083, 907; 4,369,065; and 4,407,882.

The preferred inhibitor-containing composition is an aqueous-based composition of the type that is disclosed in international patent Application No. PCT/US88/04017, published on May 18, 1989, bearing Publication No. WO89/04341. The disclosure of this publication is incorporated herein by reference. This publication discloses a water-based inhibitor-containing composition comprising: (A) a film-forming resin dissolved or dispersed in said aqueous composition; (B) an inhibitor which is effective in modifying the activity of a blowing agent and comprising particulate solids which are substantially insoluble and uniformly dispersible in the liquid medium of the composition and which have an average particle size of no greater than about 100 microns, said modifier being present in the composition in an amount of at least about 3 wt.%; and (C) optionally, a colorant or a softening agent for the modifier solids or a mixture thereof.

The preferred inhibitors for use in such aqueous-based compositions are benzotriazole and tolyltriazole whose particle size is preferably within the range of about 50 μ to about 100 μ. A highly preferred modifier/blowing agent system recommended for use in the practice of the present invention comprises benzotriazole or tolyltriazole as the modifier and a blowing agent system which includes azodicarbonamide as the blowing agent and zinc oxide as the accelerator.

It is believed that the present invention will be used most widely in connection with inhibitor-containing compositions which contain a colorant, for example, in the form of a pigment (inorganic or organic) or dye. Examples of pigments that can be used as the colorant are phthalo blue, phthalo green, scarlet red, carbon black, titanium oxide, zinc sulfide, cadmium sulfide, iron oxide, perionone, and disazo yellow. Examples of dyes that can be used as the colorant are basonyl red-NB 540, neozapon yellow 108, neozapon black X51, and neozapon blue 807.

The inhibitor-containing composition can also comprise a composition which forms a clear film. Clear compositions are conveniently formulated from a commercial printing ink which is referred to in the industry as "clear" or "reducing clear" containing no colorant.

The application of the inhibitor-containing composition to portions of the surface of the resin-based composition prevents underlying portions of the composition from expanding or permits expansion, but to a limited degree, for example, as illustrated by the printed base portion 7 in FIG. 1. The term "base portion" is used herein to refer to an unexpanded section of the expandable composition or a section which has expanded to a limited degree, that is, to an extent which is observably less than the expandable composition is capable of expanding.

Accelerator-Containing Composition

The accelerator is a material which causes the blowing agent to decompose at the temperatures of operation to a greater degree than blowing agent that is not contacted with the accelerator. Accordingly, those portions of the resin-based composition which are printed with the accelerator-containing composition are expanded as the composition is heated to a greater extent than other portions of the resin-based composition. Accelerator-containing compositions are disclosed, for example, in U.S. Pat. Nos. 3,464,934; 3,819, 783; 4,085,239; and 4,093,686. Some examples of accelerators are urea, ethanolamine, diethanolamine, pentanedione, 2-amino isobutyl triol, imidazole, and ethylene urea (2-imidazolidone). The accelerating activity of the aforementioned materials was confirmed in tests involving their use in modifying the activity of azodicarbonamide blowing agent in a foamable composition that comprised a gelled vinyl plastisol and zinc oxide.

Preferred accelerators for use in the practice of the present invention are urea, 2-imidazolidone, and imidazole. The use of urea is particularly preferred; it is capable of effecting decomposition of the blowing agent at a relatively low temperature. A particularly preferred system comprises urea used in conjunction with zinc oxide (activator) which is present in an expandable gelled vinyl plastisol composition which contains azodicarbonamide blowing agent.

The accelerator is applied typically in the form of a liquid composition that includes a liquid carrier and a binder, for example, a film-forming resin that is dissolved or dispersed in the liquid composition. Such accelerator-containing liquid compositions are well known. A preferred accelerator-containing composition according to this invention comprises water as the liquid carrier.

It is believed that the present invention will be used most widely in connection with accelerator-containing compositions which contain a colorant, for example, in the form of a pigment (inorganic or organic) or dye, such as those mentioned above for use with inhibitor-containing compositions.

The accelerator-containing composition can also comprise a composition which forms a clear film, for example, as mentioned above.

The application of the accelerator-containing composition to portions of the surface of the resin-based composition results in a relatively high level of expansion of these portions as the blowing agent decomposes to a greater extent than blowing agent in other portions of the resin-based composition. This is illustrated by the expanded portions 9 of FIG. 1.

Additional Process Parameters & Aspects of the Invention

The compositions which contain the inhibitor and the accelerator, collectively referred to as "the modifying material(s)", can be applied in appropriate designs to portions of the surface of the resin-based composition to achieve desired visual effects. Several applications are customary for multicolored effects. One or more compositions without a modifying material may be applied to portions which are unprinted, that is, portions to which the modifying material has not been applied.

It is preferred that the system comprising the blowing agent, with or without activator, and modifying materials, including the concentrations thereof, be selected so that the relative decomposition temperatures of the blowing agents underlying the various printed and unprinted portions of the expandable resin-based composition are significantly different. For example, the decomposition temperature of the blowing agent which underlies and is influenced by the accelerator-containing composition should be at least about 15° F. lower, preferably at least about 20° F. lower, than the decomposition temperature of the blowing agent which underlies the unprinted portion of the surface of the expandable resin-based composition. The decomposition temperature of the blowing agent which underlies the unprinted portion of the surface of the expandable resin-based composition should, in turn, be at least about 10° F. lower, preferably at least about 20° F. lower, than the decomposition temperature of the blowing agent which underlies and is influenced by the inhibitor-containing composition.

In applications involving the fabrication of sheeting from industrially used poly(vinyl chloride) resins in which the sheeting is formed into a roll prior to use, for example, during shipping or storage, the following should be taken into consideration. Upon unwinding the roll, it has been observed, under certain circumstances, that expanded portions of the sheeting are compressed or deformed and that they remain in such condition. This is aesthetically undesirable. It has been found that the permanency of deformation can be avoided by controlling the degree of expansion of the various expanded portions of the resin-based composition. Taking into account the aesthetic effects that are desired in the final product and the degree of expansion which permits the compressed expanded portions to recover to substantially their originally expanded form, it is recommended that expansion of the composition be controlled so that: (A) the ratio of the height (thickness) of the unprinted expanded portion of the composition to the original thickness of the foamable resin-based composition of the composite is about 1.8:1 to about 2.4:1; and (B) the ratio of the height of the expanded accelerator-printed portion of the composition to the original thickness of the foamable resin-based composition of the composite is about 2.5:1 to about 3.2:1. For aesthetic purposes, it is preferred that the expanded accelerator-printed portion be at least about 8 mils higher than the expanded unprinted portion of the composition.

The modifying material of the present invention can be applied to a backing material by any suitable means. It is believed that they will be used most widely in rotogravure applications in which the modifier material is patterned onto the surface of foamable composition by rotogravure printing cylinders. Other printing methods, including, for example, off-set gravure, flexographic processes, screen printing or relief printing, can be used also. As mentioned above, one of the advantages of the present invention is that it is capable of being practiced with the use of conventional equipment that is part of current manufacturing lines. In this connection, it should be appreciated that the product of the present invention can be made in a continuous manufacturing operation that is operated at conventional industrial line speeds, for example, about 40 to about 120 feet per minute.

It should be appreciated that the modifying material(s) which is applied to the surface of the foamable resin-based composition must be in a form which permits it to penetrate into the composition at a temperature below or lower than the temperature at which the blowing agent would normally decompose. For example, the modifying material can be a liquid or low-melting solid that remains on the surface of the foamable resin-based composition until it is subjected to heat which causes the blowing agent to decompose and which effects fusion of the resin and which causes the modifying material to penetrate into the resin-based composition for contact with the blowing agent. Such penetration and contact must take place before the temperature rises to the extent that the blowing agent decomposes to release gas.

There are various factors or parameters that should be taken into account in connection with producing a product that has the desired physical properties and multi-level, expanded appearance. The amounts and relative proportions of the blowing agent, activator (if used), inhibitor and accelerator need to be interrelated so as to produce a structurally sound and aesthetic product. The amounts and proportions of such materials will in turn depend on the temperatures of operation and particular material used.

Speaking generally, the lower the temperature used to effect decomposition of the blowing agent and to effect fusion of the resin, the lower the heating costs. A temperature which causes degradation of any of the components comprising the product (save for the decomposition of the blowing agent) is to be avoided. It is preferred in the practice of the present invention that the components be selected so that the process can be operated at a temperature which is not greater than about 400° F.

The amount of blowing agent should be that which is sufficient to produce a product having the desired expanded appearance and physical properties. It is believed that the most widely used foamable resin-based compositions will comprise about 0.5 to about 1.5 wt.% blowing agent.

A significant factor in selecting an activator and the amount to use relates also to the physical properties and the relative expansion that is desired in the final product, for example, the difference in heights of the printed and unprinted portions of the expanded product. It is believed that the most widely used foamable resin-based compositions will include about 0.3 to about 1.5 wt.% of activator. Based on experimental work with zinc oxide and azodicarbonamide, it has been observed that the effectiveness of the zinc oxide in lowering the decomposition temperature of the azodicarbonamide tends to level off as the molar ratio of the activator to the blowing agent reaches about 1.5 to 1. The use of excess quantities of activator may require the undesirable use of excess quantities of inhibitor and/or accelerator.

The amount of accelerator should be sufficient to give the desired expansion in the final product. Amounts of accelerator which cause the foam to expand to the extent that foam cells collapse or have insufficient strength should be avoided. It is believed that, for most applications, the height of the expanded portions which are produced by printing with accelerator, will be about 5 to about 15 mils higher than the expanded portions which are not printed with a modifying material. It is believed also that the amount of accelerator present in the most widely used accelerator-containing compositions will be about 5 to about 25 wt.%. The specific amounts used will depend on the particular accelerator used and the means by which the composition is applied. For example, a more concentrated composition should be used if the composition is applied from electronically engraved cells than if applied from chemically etched cells, the latter being larger and having the capability of laying down more of the composition because of the inherently larger volumes of the cells. A molar ratio of urea/zinc oxide within the range of about 0.01:1 to about 0.04/1 is exemplary of proportions that have been used effectively in applications in which the molar ratio of azodicarbonamide/ zinc oxide is within the range of about 1:0.7 to about 1:1.2.

The amount of inhibitor will depend on the particular inhibitor used and the desired appearance of the final product. It is believed that the most widely used applications will use inhibitor-containing compositions that comprise about 2 to about 25 wt.% of the inhibitor. Factors mentioned above in connection with the accelerator-containing composition should also be taken into account in connection with selecting the specific amount of inhibitor for a particular application. A molar ratio of zinc oxide/tolyltriazole falling within the range of about 0.72:0.72 to about 1.4:0.72 in combination with azodicarbonamide is exemplary of proportions that can be used in the practice of the present invention.

Figure 2:
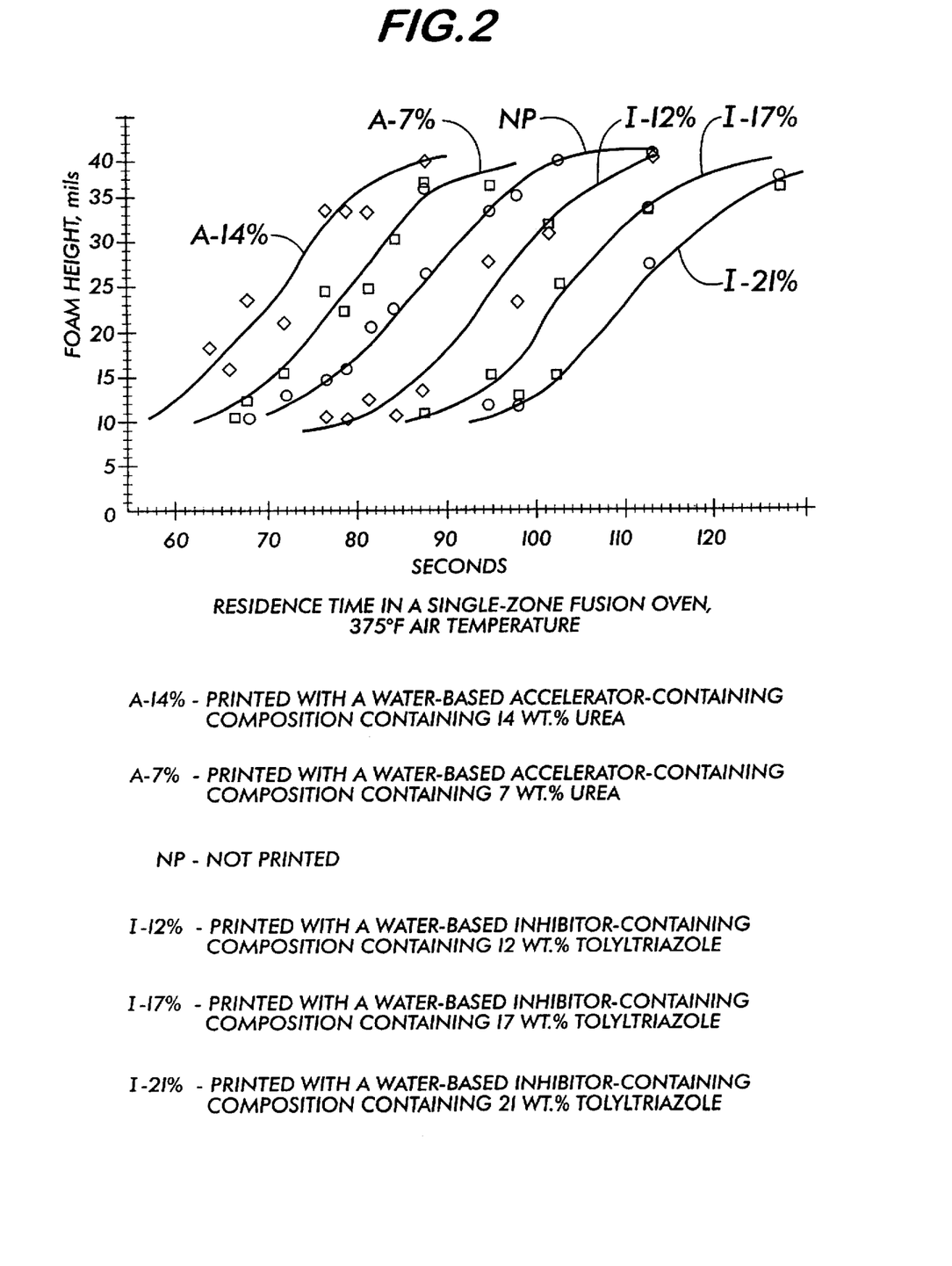
FIG. 2 is a graph which is illustrative of various aspects of the present invention.

FIG. 2 is a graph showing the influence of heat on expansion of a gelled foamable composition (azodicarbonamide blowing agent and zinc oxide activator) that is printed with accelerator-containing compositions having different concentrations of accelerator (urea) and with inhibitor-containing compositions having different concentrations of inhibitor (tolyltriazole), as identified in FIG. 2.

The samples of foamable composition that were used to collect the data which forms the basis of the curves of FIG. 2 were at room temperature before they were heated by placing them in an oven, as identified in FIG. 2. Accordingly, the longer the residence time of the sample in the oven, the higher its temperature. Expansion of the foamable composition begins when it attains a temperature at which there is sufficient gas released from the blowing agent mixture to effect expansion.

Attention is directed initially to FIG. 2 and to the curve labeled "NP" (not printed) which shows the influence of heat on samples of a gelled foamable plastisol composition containing azodicarbonamide blowing agent and zinc oxide activator. (The original thickness of the gelled foamable plastisol composition was about 11 mils). It can be seen from this curve that the sample expanded to a height of about 28 mils after exposure at 375° F. for about 90 seconds.

On the other hand, the samples printed with accelerator-containing compositions containing 7 wt.% urea and 14 wt.% urea expanded respectively to this height (28 mils) after only 81 seconds and after 72 seconds of exposure at 375° F.

Thus, it can be seen that the use of the accelerator results in a lowering of the temperature at which gas is released from the blowing agent and that the degree of the accelerating effect is dependent on the amount of accelerator that is brought into contact with the blowing agent system.

An analysis of the three curves of FIG. 2 which illustrate the effects of contacting the mixture of azodicarbonamide and zinc oxide with different concentrations of inhibitor (tolyltriazole) shows that the inhibitor raises the temperature at which gas is released from the blowing agent and that the greater the amount of inhibitor contacted with the azodicarbonamide/zinc oxide mixture, the greater the inhibiting effect on the release of the gas.

In effect, accelerators shift the onset of gas release to a lower temperature while inhibitors shift the onset of the gas release to a higher temperature.

Information which is revealed in FIG. 2 confirms that the concentrations of the modifying materials brought into contact with the blowing agent system can be controlled to produce desired design textures. The range of textures in the final product can be varied to a great extent in accordance with the practice of the present invention by varying the concentrations of the modifying materials that are used.

The present invention can be used also to excellent advantage in the fabrication of a "transfer sheet" for use in a transfer printing process. The aforementioned description of the use of the present invention entails the initial application of the involved compositions directly to the surface of the foamable resinous material. For use in transfer printing process, the compositions are not applied initially to the foamable resinous material, but instead to the surface of a support sheet. The support sheet, having printed thereon the modifier materials in predetermined fashion, is known as a "transfer sheet" which can be used by superposing it on the foamable resinous material in a manner such that the modifier materials are contacted with the surface of the resinous material. Thereafter, the support sheet is peeled away or stripped from the surface of the foamable composition leaving thereon the modifier materials in the desired pattern. Typically, heat and pressure are applied to the multi-ply structure comprising the support sheet having thereon the modifier materials and the foamable composition to ensure transfer of the modifying materials from its support sheet to the surface of the foamable composition. An example of a transfer printing process of this type is described in U.S. Pat. No. 4,482,598, the disclosure of which is incorporated herein by reference.

Experimental work associated with the development of the present invention has provided information that supports the following hypothesis respecting the influences of activators, inhibitors, and/or accelerators on a blowing agent.

It is believed that there is formed in the foamable resin-based composition (for example, a gelled plastisol) a bidentate ligand between the blowing agent (for example, azodicarbonamide) and the metal-containing activator (for example, zinc oxide). It has been observed that the decomposition temperature of the "azodicarbonamide" bidentate ligand is lower than the decomposition temperature of "uncomplexed" azodicarbonamide. It is believed that the lower decomposition temperature is at least in part attributable to weakened bond strengths between the C–N bonds which are associated with the release of nitrogen gas because the formation of the bidentate ligand involves the withdrawal of electrons from the C–N bonds, thereby weakening the strength of the bonds.

It is believed also that accelerators (for example, urea) are compounds which form a putative tetradentate ligand with zinc which is a constituent of the "azodicarbonamide" bidentate ligand. The formation of the tetradentate ligand results in the withdrawal of additional electrons from the C–N bonds of the azodicarbonamide thereby further weakening the bonds and permitting decomposition to occur in the presence of a relatively low amount of heat.

It is believed further that inhibitors (for example, tolyltriazole) are compounds which form ligands with zinc which is a constituent of the "azodicarbonamide" bidentate ligand to create a tetradentate ligand, but one which is electron-rich and which supplies electrons to the azodicarbonamide. This strengthens the C–N bonds of the azodicarbonamide, with the result that relatively high amounts of heat are required to break the bonds which are associated with the release of nitrogen gas.

Although the above explanation has been cast in terms of the functioning of specific compounds, it should be appreciated that other blowing agents and modifying materials which include sulfur, nitrogen, oxygen, and metal atoms can form ligands which function in essentially the same way as the azodicarbonamide/zinc oxide/urea/tolyltriazole system.

EXAMPLES

The following examples are illustrative of the present invention.

Example 1

A multi-level, selectively expanded, resinous based product according to the present invention was prepared utilizing the compositions and process steps described below.

Foamable Plastisol Composition

A foamable plastisol composition containing azodicarbonamide blowing agent and zinc oxide activator was prepared as follows. Into a 1-gallon container equipped with a high-speed, high-shear stirrer, the following liquid materials were added:

336 grams primary plasticizer, benzyl butyl phthalate;

148 grams secondary plasticizer, mixture of aromatic and aliphatic hydrocarbons; and 35 grams aromatic naphtha.

The ingredients were mixed well. To the liquid mixture, the following ingredients were added:

3.8 grams zinc oxide; and a pre-mixed paste composed of 13.6 grams azodicarbonamide, 6.8 grams zinc oxide, 11.6 grams secondary plasticizer, light naphthenic petroleum distillate, hydrotreated, 0.7 gram dispersing aid, petroleum distillate, and 9.3 grams titanium dioxide.

After thoroughly mixing, the following were added:

550 grams dispersion grade poly(vinyl chloride) homopolymer;

50 grams titanium dioxide;

300 grams extender poly(vinyl chloride) homopolymer; and 450 grams calcium carbonate.

All of the ingredients were mixed well. The resulting plastisol composition contained about 0.71 wt.% azodicarbonamide blowing agent and about 0.55 wt.% zinc oxide activator.

The plastisol composition was applied at a thickness of 21 mils to a felt backing having a thickness of 23.5 mils. This composite was placed in a forced-air laboratory oven having a temperature of 300° F. for three minutes to gel the plastisol composition.

Inhibitor-Containing Composition (I)

Five and three tenths (5.3) grams of isopropanol and 42.7 grams of tap water were added to 293 grams of a vinylacrylic latex reducing clear (pH 8.3–10.0). The resulting mixture was mixed well. Then 75 grams of a fine powder of tolytriazole (inhibitor) having a particle size of less than 100 μ, with 75% of the powder having particle sizes between 63 μ and 100 μ, were added gradually to the aqueous-based mixture and the mixture was mixed well. Finally, 30 grams of fumed silica were added and the mixture was mixed well. The mixture was aged 18 hours, re-mixed, and pigmented with 2.5 grams of a red pigment aqueous dispersion.

Accelerator-Containing Composition (A)

Fourteen grams of fumed silica and 28 grams of industrial grade prilled urea were added to 158 grams of a vinyl-acrylic, latex-based reducing clear (pH 8.3–10.0). The resulting mixture was mixed well. One gram of phthalocyanine green pigment aqueous dispersion was added to the mixture with stirring.

Wearlayer Composition

To a 1-gallon container equipped with a high-speed, high-shear stirrer, the following liquid materials were added:

95 grams primary plasticizer, benzyl butyl phthalate;

80 grams primary plasticizer, benzyl alkyl (C7/C9) phthalate;

150 grams secondary plasticizer, 2,2,4-trimethyl-1,3-pentanediol diisobutyrate;

35 grams secondary plasticizer mixture of aromatic and aliphatic hydrocarbons;

20 grams aromatic naphtha; and 89 grams barium-zinc stabilizer blend.

The liquid materials were mixed well. The following resins were then added with mixing:

550 grams dispersion grade poly(vinyl chloride) homopolymer; and 450 grams extender grade poly(vinyl chloride) homopolymer.

Printing of the Gelled Composition and Foaming Thereof

The inhibitor-containing composition (I) was printed directly on portions of the surface of the gelled foamable composition of the composite in a flat-bed proof press, using an electronically engraved gravure plate, 150 lpi, 40 μ cell depth, in the form of a design of intersecting straight lines.

The same plate was used to print other portions of the surface of the gelled foamable composition of the composite with the accelerator-containing composition (A). The printing was done in a manner such as to produce a plaid design in the final product.

The printed composite was dried for 30 seconds at 400° F. and then maintained for 24 hours at ambient temperature.

Thereafter, the wearlayer composition was applied at a thickness of 20 mils to the printed composite which was then heated for 3 minutes at 300° F. (air temperature) to gel the wearlayer composition.

After cooling to room temperature, the printed composite covered with the gelled wearlayer composition was expanded and the resins thereof fused. This was accomplished by placing the composite in rotating basket which in turn was placed in a forced-air laboratory oven at 400° F. (air temperature) for 2 minutes, 40 seconds. A multi-level expanded resinous product was obtained. The expanded portions of the product were measured by an optical microscope. The measurements are reported on Table 1 below. Table 1 includes also "blow ratio" values which were calculated by dividing the height of the various portions of the expanded product by the original thickness (21 mils) of the unexpanded foamable gelled layer of the composite.

TABLE 1

| Portions of Composite | Height of Portions | Blow Ratio |
|---|---|---|
| those printed with inhibitor-containing composition | 28.8 mils | 1.4/1 |
| those unprinted | 38.6 mils | 1.8/1 |
| those printed with accelerator-containing composition | 56.2 mils | 2.7/1 |

Evaluations of samples of products produced according to the procedure described in Example 1 will show that the samples have satisfactory load-bearing properties for use as floor coverings and that the textured appearance of the product is retained after being wound into a roll and then unwound.

The next example is illustrative of the use of the present invention in the fabrication of a transfer sheet for use in a transfer printing process used to make a multi-level expanded product in accordance with the present invention.

Example 2

Inhibitor-containing composition (I) above and accelerator-containing composition (A) above were printed on silicone-coated transfer paper using 150 lpi electronically engraved plates in a flat-bed gravure proof press. The printing operation included also the application to the transfer paper of a beige-pigmented latex which did not include a modifying material for the blowing agent. The latex used in the beige-pigmented composition was the vinyl-acrylic latex used in the inhibitor- and accelerator-containing compositions. The following procedure was used.

(A) The entire surface of the silicone-coated transfer paper was coated with a vinyl-acrylic latex of the type mentioned above for the purpose of forming a primer coat for the subsequently applied print layers.

(B) To portions of the coated surface formed in step (A) above, accelerator-containing composition (A) was printed in a floral design.

(C) To other portions of the coated surface formed in step (A) above, an accelerator-containing composition like (A) above, but pigmented green instead of red, was printed in a leaf design.

(D) To other portions of the coated surface formed in step (A) above, inhibitor-containing composition (I) was printed in a design representative of tile mortar lines.

(E) The aforementioned beige-pigmented composition was then applied to the entirety of the surface of the printed transfer sheet utilizing a tonal background design plate.

After each of the aforementioned compositions was applied, it was dried before the next composition was applied.

The printed side of the transfer sheet was then placed on the surface of a gelled foamable plastisol composition (like that used in Example 1) heated to 300° F. for one minute. This composite was then pressed for 30 seconds at an applied pressure of 32 pounds per square inch. The silicone-coated transfer paper was then stripped from the primer coat. The components of the printed transfer sheet, including the primer coat, were transferred completely to the surface of the gelled foamable plastisol composition.

Thereafter, a wear-layer composition, as described in Example 1, was applied to the surface of the primer coat at a thickness of 20 mils and the composite was heated for three minutes at 300° F. to gel the wearlayer composition.

The resulting composite was then expanded and the resins thereof were fused by placing the composite in a rotating basket which in turn was placed in a forced-air oven having an air temperature of 400° F. for two minutes, thirty seven seconds. Upon cooling a multi-level, selectively expanded resinous product was obtained.

In other experiments, it was observed that those expanded portions of the product treated with the accelerator-containing composition could be maximized by reducing the temperature at which the printed transfer sheet was contacted with the surface of the gelled foamable plastisol composition from 300° F. to 175° F.

The following are additional examples of inhibitor-containing and accelerator-containing compositions that can be used in the practice of the present invention.

| Inhibitor-Containing Composition (I') | |
|---|---|
| Component | % By Wt. |
| film-forming vinyl-acrylic resin latex (binder) | 33.1 |
| tolyltriazole (inhibitor) - 50 to 100 microns | 25.0 |
| amorphous silica gel (anti-blocking agent) | 2.5 |
| isopropyl alcohol | 4.0 |
| alkyl alkanolamine of moderate boiling range | 1.0 |
| viscosity modifier | 0.2 |
| surfactants | 1.0 |
| pigments | 2.2 |
| water | 31.0 |
| | 100.0 |

The inhibitor-containing composition was prepared by first admixing the film-forming resin and silica gel and adding to the resultant mixture the tolyltriazole solids and other ingredients and mixing for about 15 minutes.

| Accelerator-Containing Composition (A') | |
|---|---|
| Component | % By Wt. |
| film-forming vinyl-acrylic resin latex (binder) | 28.8 |
| isopropyl alcohol | 4.1 |
| silica gel | 6.3 |
| urea (accelerator) | 19.8 |
| alkyl alkanolamine of moderate boiling range | 0.8 |
| viscosity modifier | 0.6 |
| surfactants | 1.3 |
| pigment dispersions | 10.0 |
| water | 28.3 |
| | 100.0 |

The activator-containing composition was formulated by first admixing the film-forming resin and urea for 5 minutes and then adding the other ingredients and stirring for an additional 5 minutes. This procedure was used also to prepare the accelerator-containing composition described below.

| Activator-Containing Composition (A") | |
|---|---|
| Component | % By Wt. |
| film-forming vinyl-acrylic resin latex (binder) | 32.8 |
| isopropyl alcohol | 4.7 |
| silica gel | 7.2 |
| urea (accelerator) | 5.0 |
| alkyl alkanolamine of moderate boiling range | 0.9 |
| viscosity modifier | 0.7 |
| surfactants | 1.5 |
| pigment dispersions | 15.0 |
| water | 32.2 |
| | 100.0 |

The inhibitor-containing and accelerator-containing compositions of the examples are water-based compositions, such compositions being preferred for use in the practice of the present invention. It should be understood that organic-based compositions can be used also, for example, compositions which include organic solvents such as methyl ethyl ketone (MEK) or a blend of MEK and a less volatile solvent such as cyclohexanone.

As mentioned above, the present invention can be used to particular advantage in the production of foamed textured floor coverings. It should be understood that it can be used also to produce a variety of other kinds of products having a foamed and textured or embossed structure, including, for example, wall and ceiling coverings, table top and shelf coverings, automotive panels, book covers and decorative containers.

Based on the above description, it should be appreciated that the present invention can be used to produce, for example, a product that can have the sculptured appearance of ceramics, or the raised textures of a hand-painted tile, or the naturalistic surface variations of marble, granite, or wood. Multi-level, raised portions of the product can be produced in the same heating environment that permits the product to be formed with depressed (embossed) portions. Such products can be produced with a foam cellular structure that will withstand the pressures applied during processing, roll storage, and use by the consumer, without collapsing or puncturing. In addition, the products can be produced utilizing equipment and basic processing steps of the types that are used presently in industry to make products on a commercial scale.

We claim:

1. A process for preparing multi-level, selectively expanded, resinous sheeting comprising:

(A) providing a composite comprising a backing material and adhered thereto a layer of a foamable gelled plastisol which contains a blowing agent and an activator for said blowing agent;

(B) forming a partially printed composite by applying directly to a portion of the surface of the layer a water-based, liquid composition containing an accelerator which functions to lower the temperature at which the blowing agent decomposes and by applying directly to some, but not all, of the other portions of the surface of the layer a liquid, water-based composition containing an inhibitor which functions to decrease the activity of the blowing agent; and (C) forming the multi-level, selectively expanded, resinous sheeting by raising the temperature of the printed composite to a level such that the blowing agent decomposes and the gelled plastiol fuses, the decomposition of the blowing agent evolving gas which causes expansion of the foamable gelled plastisol in the portion where the surface is not printed and expansion of the foamable gelled plastisol in the portion where the surface is printed with said water-based, liquid composition containing said accelerator, the latter portion being expanded to a greater extent than the former, and wherein the portion of the surface printed with said inhibitor-containing composition is unexpanded or expanded to a limited degree;

wherein the concentrations of the blowing agent, the inhibitor and accelerator are such that the decomposition temperature of the blowing agent which underlies the activator-containing composition is at least about 15° F. lower than the decomposition temperature of the blowing agent which underlies the unprinted portion of said surface, and wherein the decomposition temperature of the blowing agent which underlies the unprinted portion of said surface is at least about 10° F. lower than the decomposition temperature of the blowing agent which underlies the inhibitor-containing composition and wherein the ratio of the height of the expanded unprinted portion of the layer to the original thickness of the layer is about 1.8:1 to about 2.4:1 and the ratio of the height of the expanded accelerator-printed portion of the layer to the original thickness of the layer is about 2.5:1 to about 3.2:1.

2. A process according to claim 1 wherein the concentrations of the blowing agent, the inhibitor and accelerator are such that the decomposition temperature of the blowing agent which underlies the activator-containing composition is at least about 20° F. lower than the decomposition temperature of the blowing agent which underlies the unprinted portion of said surface, and wherein the decomposition temperature of the blowing agent which underlies the unprinted portion of said surface is at least about 20° F. lower than the decomposition temperature of the blowing agent which underlies the inhibitor-containing composition.

3. A process according to claim 2 wherein the expanded accelerator-printed portion of the layer is at least about 8 mils higher than the expanded unprinted portion of the layer.

4. A process according to claim 3 wherein said plastisol consists essentially of poly(vinyl chloride) plastisol.

5. A process according to claim 2 wherein said plastisol consists essentially of poly(vinyl chloride) plastisol.

6. A process according to claim 2 wherein said activator consists essentially of zinc oxide, the inhibitor consists essentially of a compound selected from the group consisting of tolyltriazole, benzotriazole, imidazoline, hexamethoxymethylamine, trimellitic anhydride, and a mixture of two or more of said compounds and said accelerator consists essentially of a compound selected from the group consisting of urea, 2-imidazolidone, and imidazole and a mixture of two or more of said compounds.

7. A process according to claim 6 wherein the expanded accelerator-printed portion of the layer is at least about 8 mils higher than the expanded unprinted portion of the layer.

8. A process according to claim 7 wherein said blowing agent consists essentially of azodicarbonamide.

9. A process according to claim 8 wherein said inhibitor consists essentially of benzotriazole or tolyltriazole and said accelerator consists essentially of urea.

10. A process according to claim 1 wherein the expanded accelerator-printed portion of the layer is at least about 8 mils higher than the expanded unprinted portion of the layer.

11. A process according to claim 10 wherein said activator consists essentially of zinc oxide, the inhibitor consists essentially of a compound selected from the group consisting of tolyltriazole, benzotriazole, imidazoline, hexamethoxymethylamine, trimellitic anhydride, and a mixture of two or more of said compounds and said accelerator consists essentially of a compound selected from the group consisting of urea, 2-imidazolidone, and imidazole and a mixture of two or more of said compounds.

12. A process according to claim 10 wherein said plastisol consists essentially of poly(vinyl chloride) plastisol.

13. A process according to claim 11 wherein said blowing agent consists essentially of azodicarbonamide.

14. A process according to claim 11 wherein said plastisol consists essentially of poly(vinyl chloride) plastisol.

15. A process according to claim 13 wherein said plastisol consists essentially of poly(vinyl chloride) plastisol.

16. A process according to claim 1 wherein said activator consists essentially of zinc oxide, the inhibitor consists essentially of a compound selected from the group consisting of tolyltriazole, benzotriazole, imidazoline, hexamethoxymethylamine, trimellitic anhydride, and a mixture of two or more of said compounds and said accelerator consists essentially of a compound selected from the group consisting of urea, 2-imidazolidone, and imidazole and a mixture of two or more of said compounds.

17. A process according to claim 16 wherein said blowing agent consists essentially of azodicarbonamide.

18. A process according to claim 16 wherein said plastisol consists essentially of poly(vinyl chloride) plastisol.

19. A process according to claim 17 wherein said plastisol consists essentially of poly(vinyl chloride) plastisol.

20. A process according to claim 1 wherein said plastisol consists essentially of poly(vinyl chloride) plastisol.

* * * * *